Figure 1:
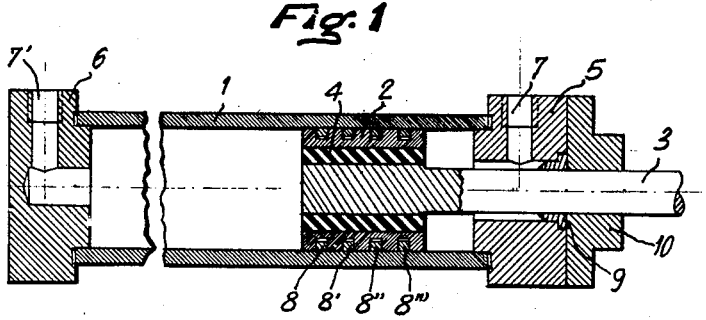

Nov. 24, 1964  R. DÉTREZ  3,158,072
DRIVING CYLINDERS ACTUATED BY FLUID UNDER PRESSURE
Filed Sept. 1, 1961  2 Sheets-Sheet 1

INVENTOR:
René Détrez
by
Richards & Geier
ATTORNEYS

United States Patent Office 3,158,072
Patented Nov. 24, 1964

3,158,072
DRIVING CYLINDERS ACTUATED BY FLUID UNDER PRESSURE
René Détrez, 54 Ave. Gabriel Peri, Le Perreux, France
Filed Sept. 1, 1961, Ser. No. 136,403
Claims priority, application France Sept. 16, 1960
8 Claims. (Cl. 92—168)

The improvements which form the object of the present invention relates to driving cylinders actuated by a fluid under pressure, such as those which are actuated by a periodic reciprocating movement and are operated by compressed air, or by means of oil or any like liquid under pressure.

The said improvements are especially directed to driving cylinders, the pistons of which are of rigid material such as cast-iron, steel, compressed material, etc.

It is known that the controls of movements actuated by driving cylinders of the compressed-air or hydraulic type are put to use to an increasing extent in the different fields of mechanical science. However these uses are still limited by reason of the fact that the construction of driving cylinders of this type can be subject to difficulties of execution.

It can thus prove difficult to form strictly concentric bores inside said cylinders between these latter and their piston-rod guides, abnormal stresses being consequently liable to take place and the piston-rod being subject to a tendency to jam, especially at the end of the return stroke.

These drawbacks can be palliated in certain cases by making use, for example, of pistons either of rubber, of cup-leather, or of any like flexible material. But these pistons of flexible material cannot be employed in all cases, and it is often necessary to resort to the use of pistons of hard and rigid material, with or without packing-rings.

The present improvements have for their object to permit the construction of driving cylinders which are capable of supporting relatively any imperfections of concentricity either in the bore or bores of the cylinder, or in the piston-head, or else in a number of these parts, and thus to permit the construction of driving cylinders of this type by workshops which are not specially equipped with high-precision tools.

These results have been obtained by "flexibly" mounting in a particular manner: either the piston of the driving cylinder, or one or a number of the bores of the said cylinder, or else both of these parts.

These improvements can be defined in concrete form as follows:

(1) A driving cylinder actuated by a fluid under pressure, the piston and piston-rod of which are made of rigid material and are composed of a number of parts coupled together, said driving cylinder being characterized in that the piston and piston-rod thereof are coupled to each other by means of one or a number of members of flexible material (such as rubber or any other equivalent material) interposed between the rigid piston and its equally rigid piston-rod, this coupling being effected in such manner that the said piston and its piston-rod are capable of radial displacement during their periodic reciprocating movements and can thus be subjected to imperfections of concentricity with respect to the cylinder.

(2) A driving cylinder as under (1), in which the flexible coupling between the rigid piston and its piston-rod which is equally rigid is effected by means of a member of flexible or equivalent material interposed between the said piston and its piston-rod, these latter being made integral with the said member of flexible material by glueing them together or in any other equivalent manner.

(3) A driving cylinder as under (1), in which the flexible coupling between the rigid piston and its piston-rod which is equally rigid is effected by means of two members of flexible or equivalent material, the said members of flexible material being interposed between the piston and its piston-rod, the aforementioned piston being provided internally with a shouldered portion, and said piston-rod being provided on the one hand with another shouldered portion and on the other hand, near the extremity thereof, with a nut or the like, the members of flexible material being made integral with said piston and said piston-rod, the nut of which, by being screwed on to said piston-rod, clamps the said members of flexible material laterally while causing them to swell out diametrally beneath said rigid piston.

(4) A driving cylinder as under (1), in which the flexible coupling between the rigid piston and its piston-rod which is equally rigid is effected by means of two members of flexible or equivalent material, said members of flexible material being interposed between the piston and its piston-rod, each of said two members of flexible material being made integral with the aforementioned piston and with its piston-rod by being applied on the one hand against a shouldered portion formed on said piston-rod near the extremity thereof, and by being held in position on the other hand by means of a ring which is screwed into the interior of one of the extremities of said piston and which clamps the members of flexible material laterally while causing them to swell out diametrally beneath said rigid piston.

(5) A driving cyinder as under (1), in which the flexible coupling between the rigid piston and its piston-rod which is equally rigid is effected by means of a member of flexible or equivalent material interposed between said piston and its piston-rod which is hollow, said member of flexible material being made integral with the aforementioned piston and with its piston-rod by being applied on the one hand against a shouldered portion formed on said piston-rod and by being held in position on the other hand by means of a nut which is screwed on to said piston-rod and which clamps said member of flexible material laterally while causing it to swell out diametrally beneath the rigid piston.

(6) A driving cylinder actuated by a fluid under pressure, characterized in that the piston-rod of said driving cylinder slides inside one or a number of sleeves forming a bearing and disposed inside said cylinder, either directly or indirectly by means of one or a number of flexible members which are each interposed between said sleeve and said cylinder, the aforementioned member or members of flexible material being made integral with said sleeve or sleeves forming a bearing and with the cylinder by means of an element which is applied laterally against the flexible members and causes them to swell out diametrally between the cylinder and the sleeve or sleeves which form a piston-rod bearing.

(7) In combination with the driving cylinder as under (6), the active extremity of the piston can also be made "flexibly mounted" by one of the means described under (1) to (4) or by any equivalent means.

In order that the invention may be more clearly understood, and by way of examples which are not limitative in any sense, examples of execution are illustrated as seen in elevation and in axial cross-section in FIGS. 1 to 5 of the accompanying drawings, to which reference will be made below.

With regard to FIG. 1, which illustrates one of the driving cylinders hereinbefore specified:

The reference 1 designates the cylinder proper, the reference 2 is given to the piston (of the rigid type), 3 refers to the piston-rod, while 4 refers to a member of flexible material interposed between said piston and its piston-rod; these latter being made integral with the said member of flexible material by sticking them together in a manner similar to that of rubber elements cemented to metallic elements; the "flexible" combined assembly of the piston inside the cylinder and the piston-rod being thus carried into effect.

The references 5 and 6 respectively designate the back and the head of the cylinder 1. These latter can be fixed to the cylinder in a detachable manner. The orifices 7 and 7' are orifices for the flow of fluid under pressure.

On the piston 2 are shown the packing-rings 8, 8', 8" and 8'''. Their number can be different and they can even be dispensed with according to requirements. The reference 9 designates a bearing-bush of the piston-rod and 10 is the reference given to a cover-plate for closing the back of the cylinder.

The fixation of the back and of the head of the cylinder is shown in simple diagrammatic form and can be carried out in any suitable manner.

Figure 2:
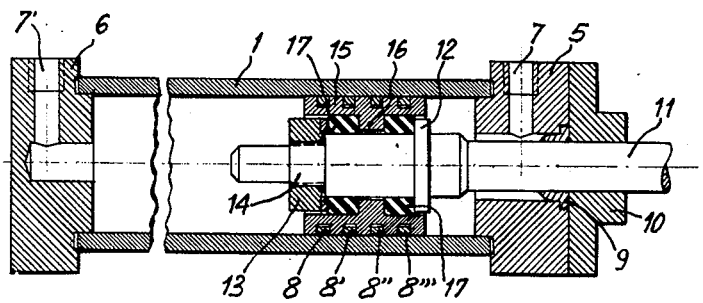

FIG. 2 also illustrates one of the driving cylinders described above. In this example, references 1, 5, 6, 7, 7', 8, 8', 8", 8''', 9 and 10 respectively designate the same elements as those of FIG. 1. But the piston-rod 11 is different from the piston-rod 3 of FIG. 1.

The said piston-rod 11 is in fact provided with a shouldered portion 12 as well as with a ring 13 forming a nut over the threaded portion 14.

Furthermore, the piston 15 is different from the piston 2 of FIG. 1 in that it also comprises a shouldered portion 16 beneath its wall and near its center.

The flexible combined assembly of the piston inside the cylinder and the piston-rod is effected by means of the two flexible members 17 and 17' which are each applied on the one hand against the shouldered portion 12 of the piston-rod and, on the other hand, against the shouldered portion 16 of the piston itself, these two flexible members being clamped tightly by the ring 13 which is fixed on to the threaded portion 14.

In all the driving cylinders forming the object of the invention, one or a number of portions of the piston can be shaped in such manner as to form a damping device or "dash-pot" inside the cylinder. Although this latter is not a characteristic feature of the invention, a device of this type has been illustrated in FIG. 2.

Figure 3:
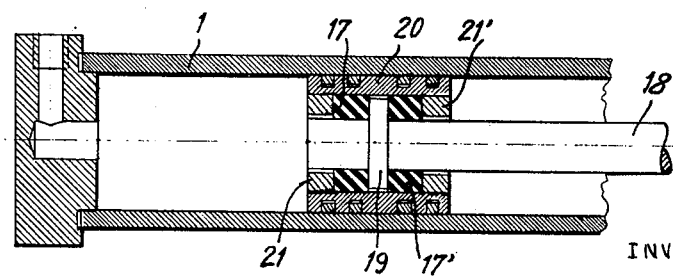

In the example of FIG. 3 which also relates to one of the driving cylinders hereinbefore specified, the references 1, 6, 7', 8, 8', 8", 8''', 17 and 17' respectively designate the same elements as those of FIGS. 1 and 2. Those members which differ from those already described are: the piston-rod 18 on which is formed a shouldered portion 19 disposed beneath the piston 20 and near the center of the interior of said piston. The said piston 20 is provided in the interior of its extremities with the two rings 21 and 21' which are screwed into the aforementioned piston.

By being screwed in this manner, these two rings have for their object to clamp the two flexible members 17 and 17' against the shouldered portion 19 and thus to cause said flexible members to swell out inside the piston 20 as well as against its piston-rod 18. The "flexible" combined assembly of the piston inside the cylinder and the piston-rod is thus achieved.

Figure 4:
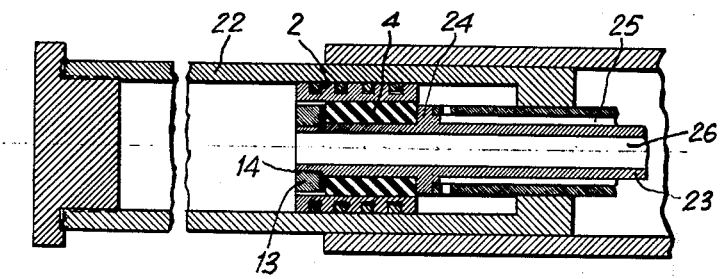

FIG. 4 also illustrates one of the driving cylinders specified.

In this figure there has been taken as a further example the application of the invention to a hollow cylinder which permits the flow of fluid under pressure inside the piston-rod.

Consequently, there are only two members which are common to the driving cylinders already described. In this example, 22 is the reference given to the cylinder proper, 2 is the reference given to the piston which is similar to that of FIG. 1, while the reference 23 designates the hollow piston-rod which comprises the shouldered portion 24 as well as the conduits 25 and 26 for the flow of the liquid under pressure.

The reference 4 designates a member of flexible material which is also similar to that of FIG. 1. The reference 13 is given to a ring forming a nut, similar to that of FIG. 2. The head of the cylinder is given the reference 27 and the back of this latter is designated by 28, while 29 refers to a slideway in which the driving cylinder slides externally.

The combined tight assembly of the piston inside the cylinder together with the piston-rod is obtained by means of the flexible member 4 which is applied against the shouldered portion 24 of the piston-rod, this flexible member being held clamped by the threaded ring 13 which is engaged over the threaded portion 14 of the piston-rod.

Figure 5:
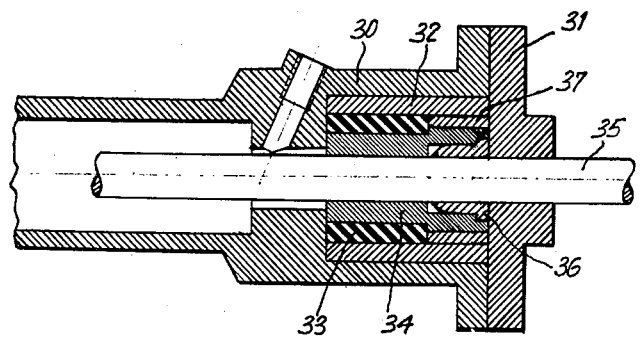

FIG. 5 also illustrates one of the driving cylinders as described and is shown therein in elevation and in axial cross-section. However, a further example has been taken in the application of the invention to a cylinder in which it is the piston-rod which slides inside the "flexible" portion of the cylinder.

In this example, that extremity of the cylinder which usually comprises the "flexible" portion and piston have not been illustrated. The said piston can in fact be similar to one of those which have already been illustrated or it can be of any other suitable design.

In this figure, the reference 30 applies to the cylinder which has been partially illustrated at the back end thereof, 31 is the reference designating a cover-plate for the closure of this back end, 32 designates a detachable sleeve, 33 designates a flexible member which can be housed either inside the sleeve 32, or directly inside the cylinder, 34 designates a bearing-sleeve, 35 designates a portion of the piston-rod, this latter not having been illustrated, 36 designates a sealing-ring and 37 is a bearing member.

The "flexible" combined assembly of the cylinder and piston-rod is obtained by means of the lateral thrust of the member 37 against the extremity of the flexible member 33 in such manner as to result in the swelling of this latter, either directly or indirectly, on the one hand inside the cylinder or inside the sleeve 32 carried by the cylinder, and on the other hand inside the bearing-sleeve 34.

As it can be seen, the "flexible" combined assembly of the cylinder and piston-rod of the driving cylinder forming the object of the invention is applicable to all pistons which are desired to be rigid in that portion which is in contact with the sliding surface of the cylinder.

On the other hand, it is known that the concentricity obtained by the use of cups of leather or rubber disposed at the periphery of the pistons inside the cylinders is rarely accurate and that this imperfection of concentricity has a tendency to produce abnormal stress on the piston-rod during its periodic reciprocating movements of displacement.

The same applies, moreover, in the case of the use of rigid pistons, whether piston-rings are employed or not, these latter being liable to give rise to leakage.

The use of members of flexible material which are securely fixed as already stated, between the rigid piston and its rod, permits the said flexible material to move and to be deformed, not only concentrically with respect to the rigid members by which it is surrounded, but also in oblique planes.

In this manner, in each driving cylinder thus constructed, the piston-rod remains constantly concentric with the bearing-sleeve in which it moves, while the rigid piston can be located in another concentric direction which may not be parallel to that referred-to above.

It is clearly understood that it will be possible to devise alternative forms, detail improvements and uses of equivalent means, without thereby departing either from the scope or the spirit of the present invention.

What I claim is:

1. A driving unit actuated by fluid under pressure, comprising in combination, a rigid cylinder, a piston comprising rigid outer surfaces engaging and guided by rigid inner surfaces of said cylinder, a rigid piston rod, means connected with at least one end of said cylinder for engaging and guiding said piston rod, and at least one flexible member interposed between said piston and said piston rod and firmly connected therewith, said piston, said flexible member and said piston rod being rectilinearly reciprocated as a single unit by said fluid, whereby said flexible member compensates for concentricity imperfections in said cylinder and said piston.

2. A driving unit in accordance with claim 1, wherein said means comprise at least one sleeve located within said cylinder and constituting a bearing for said piston rod, at least one flexible member interposed between said sleeve and said cylinder, and an element laterally engaging the last-mentioned flexible member and pressing it against said sleeve and said cylinder.

3. A driving unit actuated by a fluid under pressure, comprising in combination, a rigid cylinder, a piston comprising rigid outer surfaces engaging and guided by rigid inner surfaces of said cylinder, a rigid piston rod having a shouldered portion and a threaded portion spaced therefrom, means connected with at least one end of said cylinder for engaging and guiding said piston rod, a nut carried by the threaded portion of said piston rod, and at least one flexible member interposed between said nut and the shouldered portion of said piston rod and contacting circumferential portions of said piston and said piston rod, said nut clamping said flexible member upon siad piston rod, said piston, said flexible member and said piston rod being rectilinearly reciprocated as a single unit by said fluid, whereby said flexible member compensates for concentricity imperfections in said cylinder and said piston.

4. A driving unit in accordance with claim 3, wherein said means comprise at least one sleeve located within said cylinder and constituting a bearing for said piston rod, at least one flexible member interposed between said sleeve and said cylinder, and an element laterally engaging the last-mentioned flexible member and pressing it against said sleeve and said cylinder.

5. A driving unit actuated by a fluid under pressure, comprising in combination, a rigid cylinder, a piston comprising rigid outer surfaces engaging and guided by rigid inner surfaces of said cylinder, said piston having an inwardly extending shouldered portion, a rigid piston rod having a shouldered portion and a threaded portion spaced therefrom, means connected with at least one end of said cylinder for engaging and guiding said piston rod, a flexible member interposed between the shouldered portion of said piston and the shouldered portion of said piston rod and contacting circumferential portions of said piston and said piston rod, a nut carried by the threaded portion of said piston rod, and another flexible member interposed between said nut and the shouldered portion of said piston and contacting circumferential portions of said piston and said piston rod, said nut clamping said flexible members upon said piston rod, said piston, said flexible members and said piston rod being rectilinearly reciprocated as a single unit by said fluid, whereby said flexible members compensate for concentricity imperfections in said cylinder and said piston.

6. A driving unit actuated by a fluid under pressure, comprising in combination, a rigid cylinder, a piston comprising rigid outer surfaces engaging and guided by rigid inner surfaces of said cylinder, said piston having two spaced inner threaded portions, a rigid piston rod having a shouldered portion located between said threaded portions of the piston, a flexible member interposed between said shouldered portion and one of said threaded portions and contacting circumferential portions of said piston and said piston rod, a nut carried by said one threaded portion and engaging said flexible member, another flexible member interposed between said shouldered portion and the other one of said threaded portions and contacting circumferential portions of said piston and said piston rod, and another nut carried by the other threaded portion and engaging said other flexible member, said nuts clamping said flexible members upon said piston rod, said piston, said flexible members and said piston rod being rectilinearly reciprocated as a single unit by said fluid, whereby said flexible members compensate for concentricity imperfections in said cylinder and said piston.

7. A driving unit in accordance with claim 1, wherein said means comprise at least one sleeve located within said cylinder and constituting a bearing for said piston rod, at least one flexible member interposed between said sleeve and said cylinder, and an element laterally engaging the last-mentioned flexible member and pressing it against said sleeve and said cylinder.

8. In a driving unit, a movable piston member, a movable piston rod member connected with said piston member and movable therewith, said two members being adapted to carry out a joint rectilinear reciprocating movement, two interconnected stationary coaxial cylindrical guiding members, each of said guiding members guiding a separate movable member, and a flexible member extending in the direction of said movement and located between two of said four members.

References Cited in the file of this patent
UNITED STATES PATENTS

| | | |
|---|---|---|
| 2,134,072 | Christensen | Oct. 25, 1938 |
| 2,422,327 | Winslow | June 17, 1947 |
| 2,436,908 | Van Weenen et al. | Mar. 2, 1948 |
| 2,978,080 | Beatty | Apr. 4, 1961 |